United States Patent [19]

Hankins et al.

[11] 4,233,601
[45] Nov. 11, 1980

[54] DISPLAY SYSTEM

[75] Inventors: Harold C. A. Hankins, Glossop; Gordon Hughes, Macclesfield; Robert W. Laker, Polegate, all of England

[73] Assignee: International Computers Limited, London, England

[21] Appl. No.: 892,206

[22] Filed: Mar. 31, 1978

[30] Foreign Application Priority Data

Apr. 4, 1977 [GB] United Kingdom ............... 14122/77

[51] Int. Cl.² .............................................. G06F 3/14
[52] U.S. Cl. .................................. 340/703; 340/750
[58] Field of Search ............... 340/324 AD, 703, 750, 340/701, 789, 791

[56] References Cited

U.S. PATENT DOCUMENTS

| | | | |
|---|---|---|---|
| 3,480,943 | 11/1969 | Manber | 340/324 AD |
| 3,582,905 | 6/1971 | Kraatz | 340/324 AD |
| 3,925,776 | 12/1975 | Swallow | 340/324 AD |
| 3,944,997 | 3/1976 | Swallow | 340/324 AD |

*Primary Examiner*—Marshall M. Curtis
*Attorney, Agent, or Firm*—Hane, Roberts, Spiecens & Cohen

[57] ABSTRACT

A system for displaying data, especially graphics data in color or grey scale on a raster-scanned display device. The information to be displayed is supplied in a coded representation in which a run of a new display value is represented by a transition code element representing at least the display value of the first picture element of the run, followed by a run-length code indicating the length of the segment of picture elements following the element or elements represented by the transition code. The coded representation is decoded to drive a display device.

6 Claims, 11 Drawing Figures

DISPLAY SYSTEM

FIELD OF THE INVENTION

This invention relates to display systems, especially for displaying graphics data in colour or grey-scale on a refreshed raster-scanned display. It is concerned in particular with representing the data to be displayed in a coded format which allows compression of the data for storage or transmission, and with decoding the compressed representation.

DESCRIPTION OF THE PRIOR ART

A method of encoding black-and-white graphics data for facsimile transmission has been described in "Dictionary Look-up Encoding of Graphics Data" by H. E. White, M. D. Lippman, and K. H. Powers in "Picture Band Width Compression" edited by T. H. Huang and O. J. Tretiak (Gordon and Breach, 1972). This method uses, among others, codewords which represent the run-lengths of alternate runs of black and white. Since there are only two possible display values, which are known to alternate, there is no need to transmit display value information. In this method these codewords actually represent a number of elements up to and including the first of the new display value. We have ourselves, in U.S. patent application Ser. No. 660,689, described an application of this coding method to a refreshed raster-scanned display.

A method of providing a wider range of display values on a raster-refreshed display is described in "A grey scale graphic processor using run-length encoding" by B. A. Laws, published in the Proceedings of the Conference on Computer Graphics, Pattern Recognition and Data Structure, held by the IEEE Computer Society in May 1975. There each run consists of the whole sequence of elements of the same intensity from one transition to the next. The article points out that codewords defining the length of the run could include data fully defining the intensity of the elements of the run. However, the method actually proposed achieves a smaller bandwidth by selecting between preset display values. Additional codewords are included to preset these values. But these codewords add to the timing difficulties which exist in driving the display since they have no immediate influence on it.

SUMMARY OF THE INVENTION

In our invention code elements of two types are provided. The first represents the display value or values of one or more picture element and the second represents the length but not display value of a segment of picture elements of the same display value preceded by another of the same display value. Using the invention a run of new display value can be represented by a first code element defining the new display value for one at least of its elements, followed by a second code element defining a segment which continues the display value set up by the preceding code of the first type. These code can be retrieved or transmitted in sequence, with each immediately controlling the display value of a picture element and there is no need for a bandwidth capable of transmitting both simultaneously.

Advantageously, each first code element defines the display values of a plurality N of picture elements and each second code element defines a segment whose length is N or an integral multiple of N. A run of consecutive picture elents of the same display value can be represented by this method even though its length is not a multiple of N, because the first element of the run may be any one of the elements defined by the first code element. Yet the code elements need be transmitted or retrieved at a maximum rate of only 1/N the speed required if the first code elements define only one element.

The sequence of codes representing the data may include codes of a third type each defining a correlation relationship between picture elements of two subsequences of picture elements (for example, two lines of a raster display). It is particularly useful in this case that the display value of a segment defined by a code of the second type is set by the preceding element, because the display value of the preceding element can be set by the code of the third type.

DESCRIPTION OF THE DRAWINGS

A system in accordance with the invention will now be described in greater detail by way of example with reference to the accompanying drawings, in which.

DESCRIPTION OF THE PREFERRED EMBODIMENT

Introduction

Figure 1:
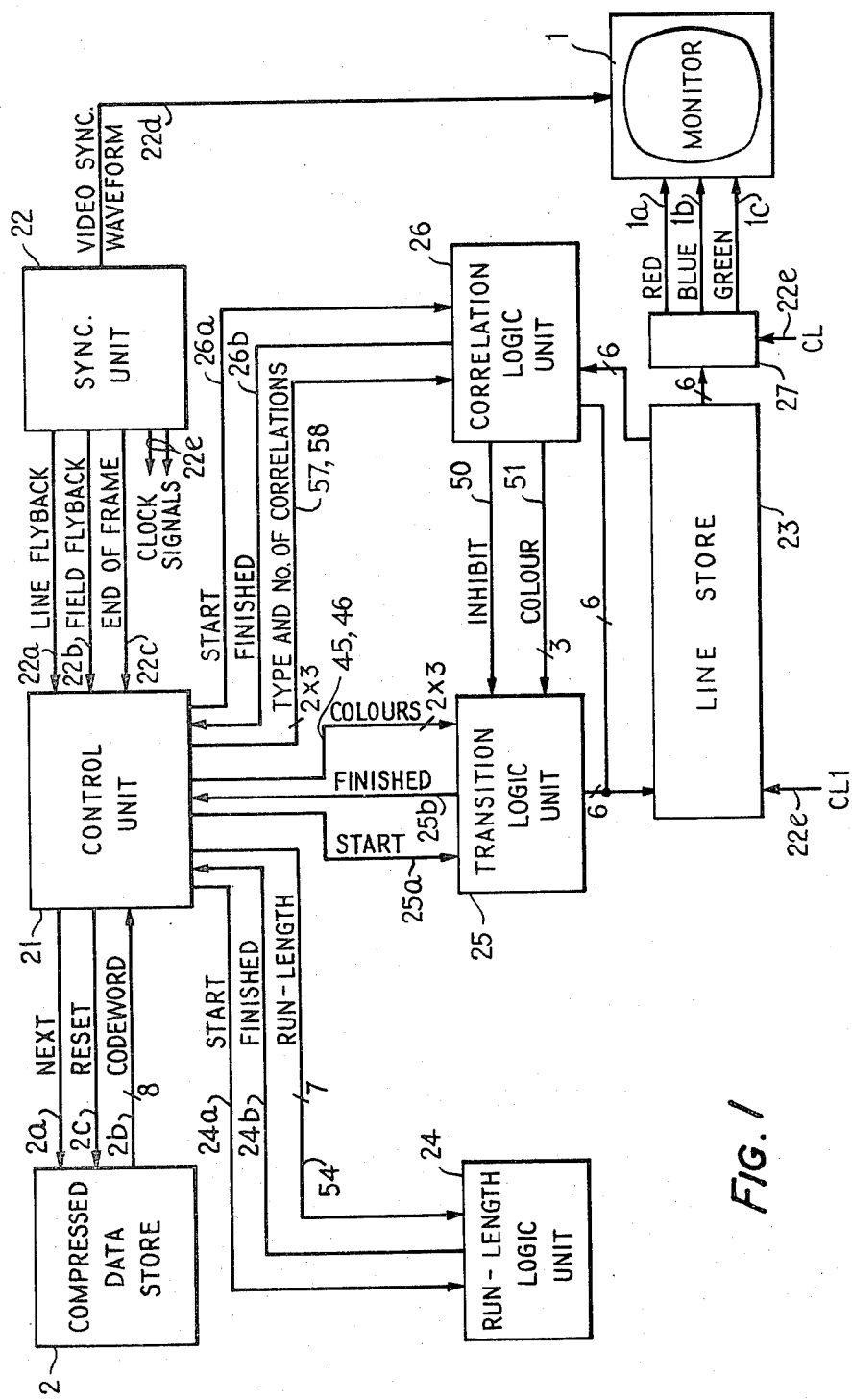
FIG. 1 is a general block diagram of the system.

The overall system, as shown in FIG. 1, displays data on a standard TV colour monitor 1 which produces a display by a raster scan of two interlaced fields. The data is held in a compressed form in a store 2 and is output and decompressed dynamically once for each scan cycle of the monitor to refresh the screen.

Figures 2, 3A, 3B, 3C, 4:
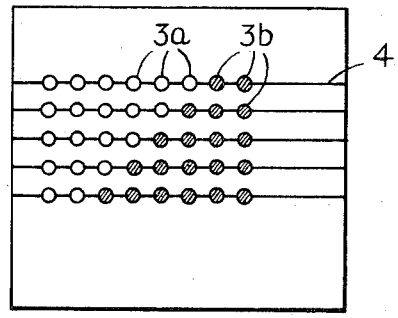
FIG. 2 is a diagram of a fragment of a display.
FIG. 3a is a diagram showing part of a scan line.
FIG. 3b shows how the scan line of FIG. 3a may be represented by transition and run-length codes.
FIG. 3c shows how another scan line having a transition aligned with that of the scan line of FIG. 3a may be represented by transition and run-length codes.
FIG. 4 is a diagram of parts of three scan lines, illustrating correlation codes.

A fragment of a typical display is shown in FIG. 2. It is formed as an array of picture elements 3a and 3b arranged along the scan-lines 4 of the monitor 1. The colour of each picture element can be separately controlled by brighting up the required guns at the instant the beam reaches the position of that picture element. In this system there are three bits of colour information for each element, each specifying whether one of the red, blue or green guns is to be on or off. But, of course, if a wider range of colour or brightness is desired more bits of colour information may be provided which control the intensity, and not just the on-off state of each gun.

The system is designed primarily for geometric or diagrammatic displays in which there are areas of different colours, such as those formed by the picture elements 3a and 3b of FIG. 2.

CODING SCHEME

The data held in the store 2 consists of codewords which are retrieved in sequence and define the colours of the picture elements taken in the order in which they are scanned. Basically the codewords are chosen by reference to the points on the scan-lines at which transitions to new colours, such as those between the elements 3a and 3b, occur.

The codewords are selected from a repertoire having three main types, which will be termed transition, run-length and correlation codes.

Transition codes define the colours of each of a pair of picture elements, which need not be the same colour. In general one of these elements is the first element of a run of a new colour.

Run-length codes define the length (but not colour) of a segment of picture elements of the same colour. The segment must have an even number of elements. For most run-length codes it is preceded by another element of the same colour, but there is a subsidiary type of run-length code which is an exception, as discussed below.

Correlation codes define one or more consecutive transitions by their relation to transitions in the preceding line scanned.

In this scheme both run-length and transition codes represent even numbers of elements. However, any scan line can be represented by a sequence of codewords taken from these two types, even though the runs of elements of the same colour out of which the scan line is built up may contain an odd or even number of picture elements.

For example, FIG. 3a shows a run of an even number of red elements followed by part of a run of green elements, the elements of these two colours being denoted by the letters R and G respectively. FIG. 3b shows how they may be represented by a sequence of codewords 5 to 8, the codewords being shown as boxes round the elements they represent. The first two elements are represented by a transition code 5, and the length of the remainder of the run of red elements is represented by a run-length code 6. There then follows a transition to a new colour, specified by a transition code 7, followed by a run specified by a run-length code 8.

FIG. 3c shows how an odd-length run may be represented. Following the transition code 5 is a run-length code 9 which represents not the full length of the remainder of the run, but the next lowest even number. The final element of the run is carried over and its colour is represented by the first element of the transition code 10. The second element of the transition code then sets the colour for the run-length code 11 which follows.

The first element of a run of a new colour (the element after the transition) can therefore always be represented by either the first or the second element of a transition code. The segment defined by a run-length code is thus preceded by one or more elements of the same colour.

As mentioned above, there is an exception to the main class of run-length codes in which a segment defined by a run-length code must be preceded by another element of the same colour. A scan-line may start with a run-length code, and since the background of a display is often black, it is then assumed that the colour of this initial run is black.

Transition codes may follow one another if colours change too frequently to be represented by run-length codes.

Many transitions lie on lines marking the boundaries of coloured areas and are consequently related to transitions on neighbouring scan lines. Compression is increased by indicating the relationship between these transitions by correlation codes.

FIG. 4 shows sections from three consecutive scan-lines, 12, 13 and 14, which therefore come from both fields. Each scan-line is correlated with the previous scan-line of its own field, not the intervening line of the other field. Thus the line 14 is correlated with the line 12. The figure shows a vertical correlation 15 between the position of a transition in the line 14 and the position of the corresponding transition in the line 12. It also shows a right correlation 16, that is, one in which the position of the transition in the line 14 is to the right of the position corresponding transition in the line 12.

One correlation code may represent up to eight consecutive transitions provided they are all correlated in the same way with the previous scanned line of the field. But considering for the moment a correlation code for one transition, it indicates that the elements in the line in question are to be given the same colours as those in the previous line, with the transition to the second colour taking place in a position determined by the type of correlation. The correlation code in this implementation specifies all the elements up to and including either one or two elements following the transition, so as to make the total number of elements that it specifies even. Thus, the transitions in the line 14 would be represented by a vertical correlation code specifying the elements in a box 18.

If there is more than one correlation defined by the code it defines all the elements up to and including one or two following the last transition of the code, again so as to make the total even.

In this particular implementations only correlations which are vertical or an even number of places to the right or left may be defined by correlation codes. But since the correlation is between alternate lines this still allows boundaries at 45° to be represented in this way.

Even single-correlation codes increase the compression, since they avoid the need to store or transmit colour information. Multiple-correlation codes increase the compression still further.

Besides the three code types already described there are several control codes. The complete repertoire is given by the following table, in which the codewords are expressed as octal numbers.

| Codeword | Type | Significance |
|---|---|---|
| 000 | control | new-line |
| 001 to 200 | run length | length of run divided by two |
| 201 | control | end of field |
| 202 | control | end of frame |
| (202 to 207) | (spare) | |
| 210 to 277 | correlation | second digit |
| | | 1  6 elements right |
| | | 2  4 elements right |
| | | 3  2 elements right |
| | | 4  vertical |
| | | 5  2 elements left |
| | | 6  4 elements left |
| | | 7  6 elements left |
| | | third digit |
| | | The number of correlations (0 = 8 correlations) |
| 300 to 377 | transition | the second and third digits represent the colours of first and second elements respectively, as |

| Codeword | Type | Significance |
|---|---|---|
| | | -continued |
| | | follows: |
| | | 0 black |
| | | 1 red |
| | | 2 green |
| | | 3 yellow |
| | | 4 blue |
| | | 5 magenta |
| | | 6 cyan |
| | | 7 white |

The run-length codes represent segments of lengths 2 to 256 elements. Longer segments are represented by consecutive run-length codes. So, besides being preceded by a transition code, a run-length code may be preceded by another run-length code. It may also be preceded by a correlation code. In both these cases, too, the segment defined by the run-length code is preceded by at least one element of the same colour.

OUTLINE OF THE SYSTEM

The store 2 holds in encoded form the data for a complete display, with the data for one field followed by that for the other. The store is loaded from, for example, a central processor, which may have carried out the encoding of the original graphic data, doing so in such a way as to cause the decoding apparatus to produce the correct display. During each scan cycle each codeword is output in turn in response to a NEXT signal on a line 2a from a control unit 21, and is supplied to the control unit 21 on lines 2b. The codes are stored and supplied as the eight-bit binary equivalents of the octal numbers given above.

The control unit 21 is microprogrammed to respond to the codewords. It includes a read-only control memory to whose address register the codeword is supplied; as a result the word stored at that address, which defines the control signals issued by the unit for that codeword, is output to a control register. Each bit position of the control register is connected to one of the control lines of the system. (Alternatively, a less horizontal format may be used in which the more significant bits of the control register indicate the code type and are used to bit-steer the remainder).

The control unit 21 receives line flyback, field flyback and end-of-frame signals from a sync unit 22 on lines 22a, 22b and 22c respectively. The sync unit 22 also supplies a video synchronisation waveform to the monitor 1 on a line 22d. It produces its output from a counter chain counting from a basic clock operating at the picture element rate. It also outputs clock signals for the rest of the equipment on lines 22e; these are at the picture element rate and at half that rate (once every two picture elements), in a multiphase set and are suppressed during flyback and when the beam is not scanning the part of the screen which shows the display.

The system works a scan-line in advance and fills a line-store 23, a six-bit wide shift register of which each stage holds the colour information for two picture elements. The register 23 is clocked in synchronism with the scanning of each even picture element and its output is multiplexed by a 6-to-3 multiplexer 27 at the picture element rate to provide a drive output supplied to the monitor to modulate the three colour guns as each picture element is scanned.

The line-store 23 is loaded by three logic units, a run-length logic unit 24, a transition logic unit 25 and correlation logic unit 26. Operation of each of these units is initiated by a START signal to it from the control unit 22, on lines 24a, 25a and 26a respectively, together with data specifying the details of the particular code. Each unit returns a FINISHED signal, on lines 24b, 25b and 26b respectively, when it has accepted the information and the stage has been reached for the control unit 21 to call for the next codeword. The control unit 21 forwards the signal to the store 2 as the NEXT signal on the line 2a which causes retrieval of the next codeword.

NEXT is also issued in response to a line or field flyback signal if the previous codeword was a new-line.

STORE

Figure 5:
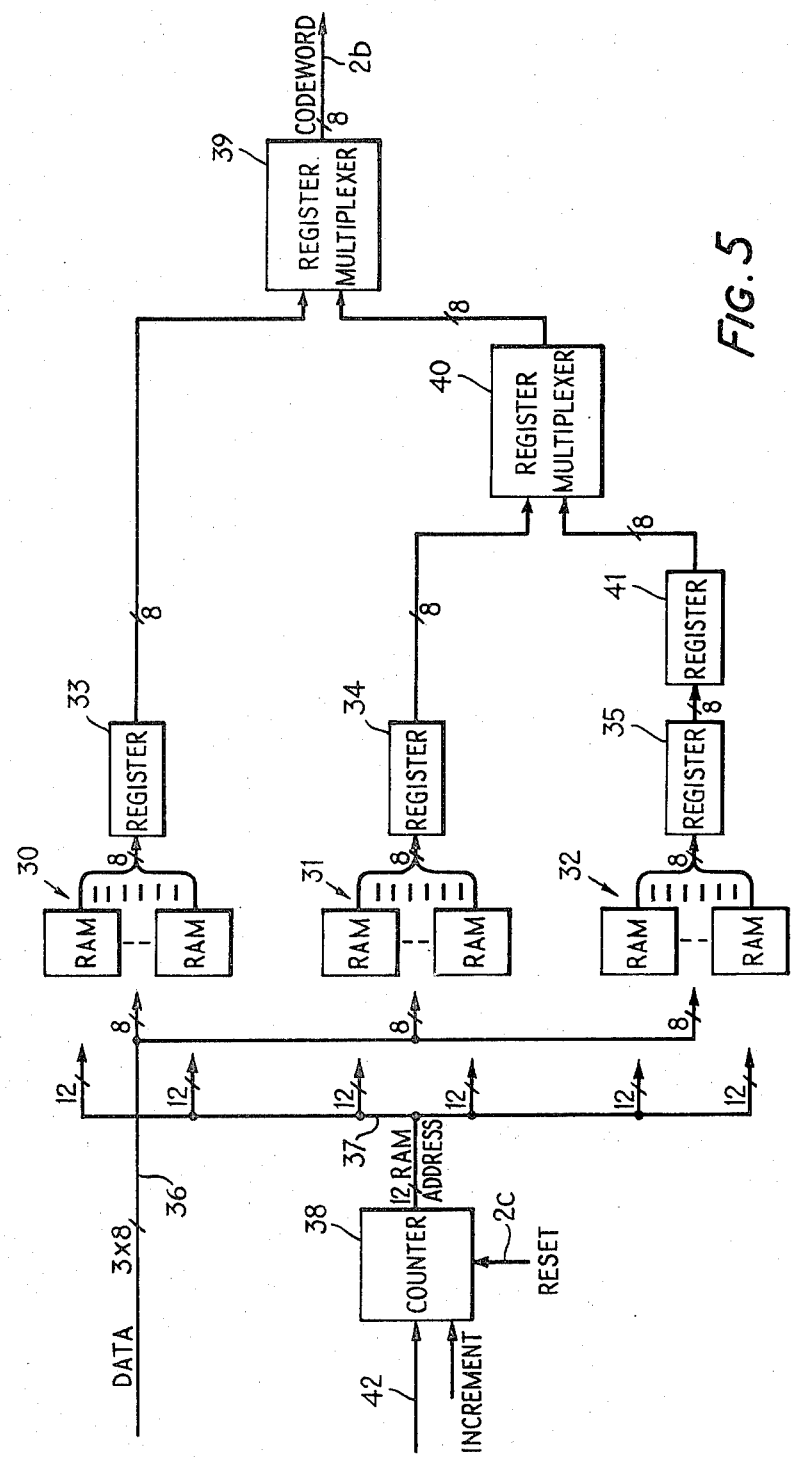
FIG. 5 is a block diagram of the store.

Referring to FIG. 5, the store is built up of three arrays of random-access memories (RAMs) 30, 31 and 32. Each array contains eight memories each providing a single-bit output. The outputs of the arrays 30, 31 and 32 are stored in registers 33, 34 and 35 respectively. Input is on a data bus 36 supplying a bit to each RAM: addressing of the individual bits of the RAMs is carried out in parallel for the different RAMs on an address bus 37 supplied with the output of a counter 38.

A problem in refreshing a display device such as a TV monitor from a compressed-data store is retrieving the data rapidly enough to keep pace with the raster scan. The store organisation is chosen to help solve this problem. The three arrays, 30, 31 and 32, store codewords in parallel and one read access causes three codewords to be output to the registers 33, 34 and 35. They are then multiplexed and buffered so that they are presented one by one by a register-multiplexer 39 to the control unit 21.

Assume that three codewords are present in the registers 33, 34 and 35 and the control unit 21 is ready for the first one. It issues a NEXT signal, which causes the codeword in the register 33 to be shifted to the register 39, where it is available to the control unit 21. At the same time the codeword in the register 34 is shifted to a register-multiplexer 40 and that in the register 35 is shifted to a register 41. The registers 30, 31 and 32 are now free to receive the next memory output and one is initiated autonomously. The address is supplied by the counter 38, which is incremented by 1 after every read so that the codewords are retrieved consecutively.

When the control unit is ready for the next codeword it issues another NEXT. The register-multiplexer 39 is switched to receive the contents of the register-multiplexer 40, which in turn receives that of the register 41. The final NEXT passes this codeword to the register-multiplexer 39. Thus the total time available for the memory access is three times the minimum interval between calls for a codeword.

At the end of each scan cycle the end-of-frame signal causes the control unit 21 to pass a reset signal on a line 2c to the counter 38. The entire cycle is then repeated with the counter counting up again from zero.

New codewords can be supplied in threes by the central processor on the data bus 36, with the address being forced into the counter 38. Alternatively the data for a complete display can be presented as triplets of codewords in sequence, the counter incrementing automatically to store the words in the right order.

The RAMs may for example by dynamic M.O.S. RAMs such as are supplied by MOSTEK. In this case the address bus 37 runs to a multiplexer which for a memory access presents the most and least significant halves of the address in sequence in the known manner. A refresh counter is also provided and connected to the multiplexer; it operates in the conventional way during the line flyback.

The movement of data in the store is controlled by an internal control unit (not shown), which is constructed from standard logic circuits. It uses four bistables: one is an indicator that data has been shifted into or out of the registers 30 to 32 (which always happens simultaneously); the others are similar indicators for the registers 39 to 40. The NEXT signal, showing that the central control 21 is ready for a codeword, clears the bistable associated with the register 39. This is a signal to the stores control to shift a new codeword into the register 39 using the existing indicator states as a guide to the movements required. It then updates the indicators of the registers affected. When the indicator for the registers 30 to 32 shows that their data has been shifted the next read is initiated.

TRANSITION LOGIC UNIT

Figure 6A:
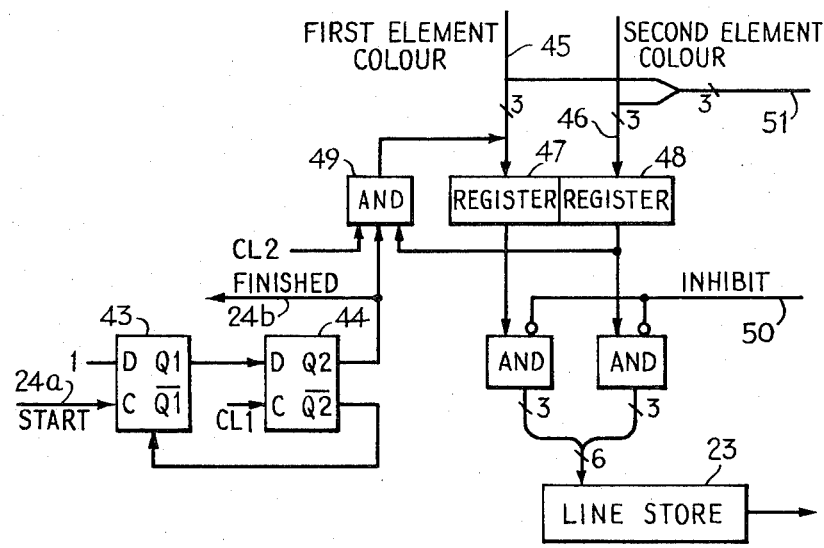
FIG. 6a is a block diagram of the transition logic unit.
Figure 6B:
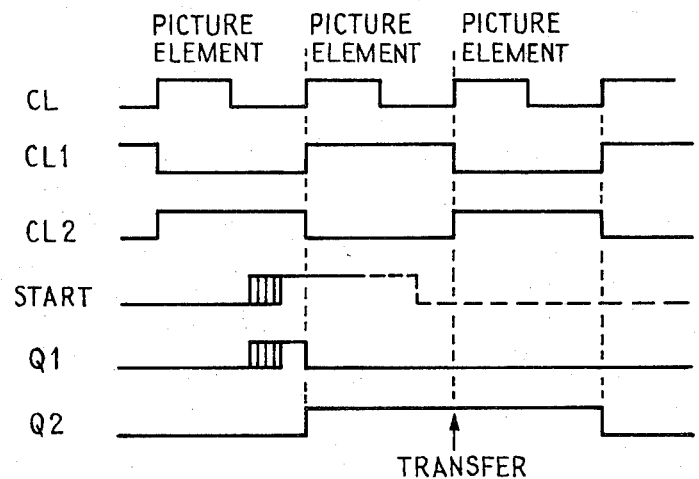
FIG. 6b is timing diagram for the transition logic unit.

Referring to FIG. 6a, when the control unit 21 receives a transition code it sends a START signal on the line 24a to the transition logic unit 25. The START signal clocks a D-type bistable 43 whose data input is set at 1. The waveforms are shown in FIG. 6b, and it will be understood that the timing of the other units behaves in a similar way. The output Q1 of the bistable 43 is the data input to a bistable 44 clocked by a clock CL1 which is at the two-element rate and goes high at the start of a pair of elements. The output Q2 of the bistable 44 then goes high and remains so for two element times, since the complimentary output $\overline{Q2}$ is connected to reset the bistable 45 on going low. The output Q2 is the FINISHED signal returned to the control unit on the line 24b.

The three bits defining the colour of the first element of the pair represented by the transition code are supplied to the transition logic unit 25 on lines 45, and the three bits defining the second element are supplied to it on lines 46. They are stored respectively in a colour register 47 and a colour register 48. From there they are entered into the line-store 23 when it is clocked by the clock CL1. The line store now holds the colours for the two elements represented by the transition code.

The output of the register 48 is connected back to the input of the register 47 through an AND gate 49. This gate also receives the FINISHED signal and a clock signal CL2 in antiphase with the clock CL1. The contents of the register 48 are thus transferred to the register 47 in synchronism with the intervening picture element and the colour of the second element of the transition code is now present in both registers.

There are two inputs to the transition logic unit 25 from the correlation logic unit 26. An INHIBIT input on a line 50 prevents the output of the colour registers 47 and 48 being transferred to the line-store 23, while a correlation is taking place. And the colour registers can be loaded from lines 51.

In response to a new-line code the control unit 21 allows the existing colour to be inserted into the line store 23 until the next line flyback signal. It then sets the colour registers 47 and 48 to black, dispensing with the need to specify black by a transition code if it is the initial colour of the next line. End-of-field and end-of-frame act similarly using the field-flyback and end-of-frame signals.

RUN-LENGTH LOGIC UNIT

Figure 7:
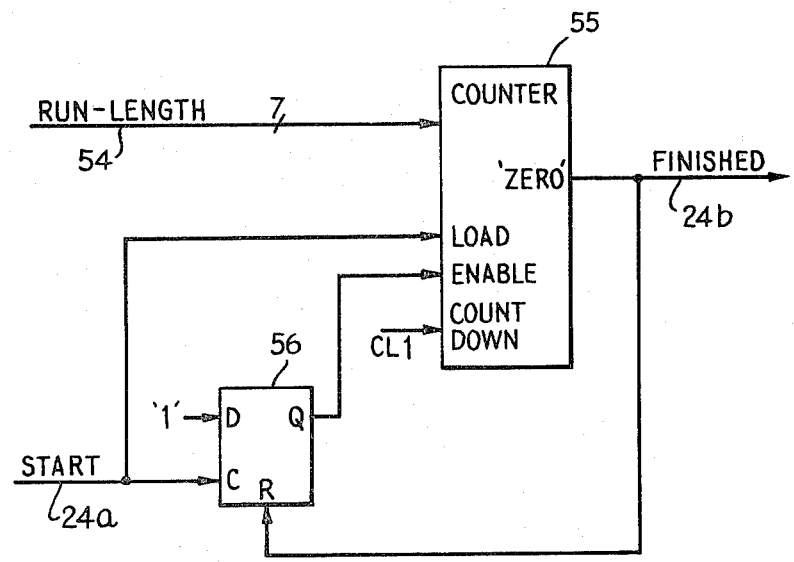
FIG. 7 is a block diagram of the run-length logic unit.

Referring to FIG. 7, the run-length logic unit contains a counter 55 loaded in response to the START signal on the line 24a with the run-length (in pairs of elements) on lines 54. The START signal sets a bistable 56 which enables the counter and causes it to be decremented by the clock CL1 once for each pair of picture elements. When the counter reaches zero it outputs the FINISHED signal on the line 24b and resets the bistable 56 to disable the counter 55.

While the counter is being decremented the values held in the two colour registers 47 and 48 are entered in the line-store 23. So the line-store receives the colour of the second transition element (which has been duplicated to appear in both colour registers 47 and 48) for as many pairs of elements as are defined by the run-length code.

CORRELATION LOGIC UNIT

Figure 8:
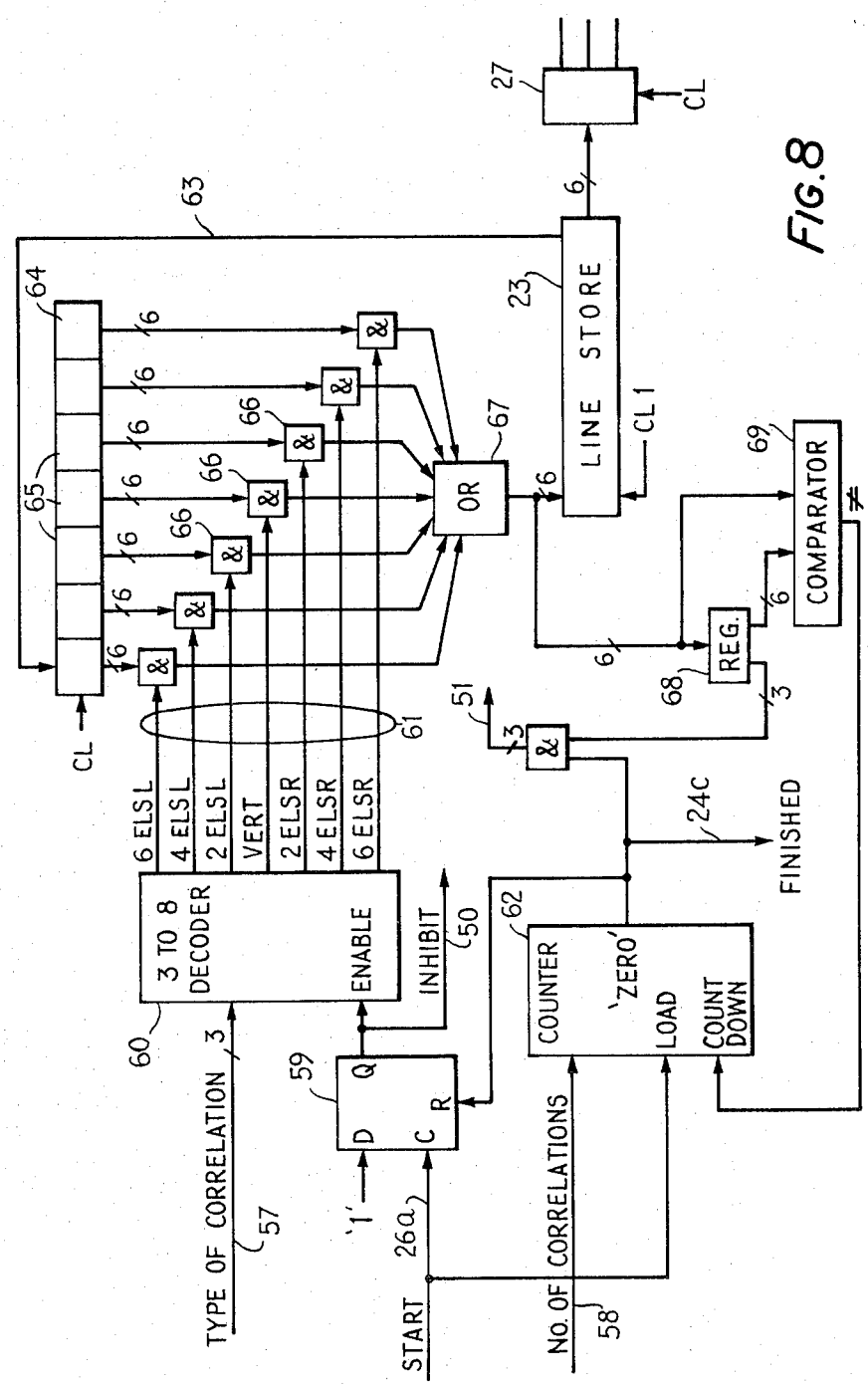
FIG. 8 is a block diagram of the correlation unit.

Referring to FIG. 8, the correlation logic unit 26 receives its START signal on the line 26a. It also receives the type of correlation as a three-bit code on lines 57 and the number of correlations as a three-bit code on lines 58. The START signal sets a bistable 59 which enables a 3-to-8 decoder 60 supplied with the type of correlation on the lines 57. It provides an output on a separate line 61 for each type. The START signal also loads a counter 62 with the number of correlations. The output of the bistable 59 forms the INHIBIT signal on the line 50 which prevents the line-store 23 receiving the contents of the colour registers during a correlation.

There is an output on a line 63 from the fifth-to-last (in this case) stage of the line-store 23. It is supplied to a serial-in, parallel-out six-bit wide shift register 64 which contains as many stages 65 as the number of types of correlation. The output of each stage 65 is supplied to an AND gate 66 which also receives the appropriate line 61 from the decoder 60. The outputs of the AND gates 66 pass to an OR gate 67 whose output is introduced into the first stage of the line-store 23.

The shift register 64 can be regarded as duplicating and extending the end of the line-store 23. A vertical correlation causes the contents of the central stage 65 of the register 64 to be re-introduced into the line-store 23. This stage corresponds to the last stage of the line-store 23, and therefore results in the display values being re-introduced in the same position as before. Left or right correlations cause the display values to be introduced appropriately shifted with respect to their original position. Recirculation continues, shifted as described, until the pair of elements including the first after the transition to a new colour detected. They are also inserted and the transition itself has therefore been shifted in the required manner.

To detect the transition the output of the OR-gate 67 is preserved in a register 68 and compared with the following output by a comparator 69. Inequality indicates a transition in either the first or second element of the pair and counts down the counter 62. Provided the code requires more than one correlation, recirculation continues until as many transitions have been detected as there are correlations defined by the counter 62. The counter then produces a zero output which resets the bistable 59 to disable the decoder 60 and forms the FINISHED signal to the control unit 21 on the line 24c.

At the end of the correlation procedure the register 68 holds the colours of two elements which do not match the preceding two. One or other of these is the first element of a new run. In order to set the colour registers correctly the value of the second of these elements is gated by the FINISHED signal onto the line 51 and then put into both colour registers 47 and 48. So, if a run follows, the colour of the second element of the transition pair is inserted in every element of the run.

GENERAL

The coding scheme described, in which transition and run-length codes define even numbers of elements, allows the rate of access to the store to be reduced below that which would be required if codewords defined the elements singly. At the same time the compression advantages of run-length encoding are retained and the runs can be either odd or even in length.

As an example of timing, the system may be used for a display in which there are 512 picture elements per line and 512 lines arranged in two fields of 256 odd and even lines. Each frame is repeated every 40 milliseconds, each field every 20 milliseconds and the line time and flyback are standard (51.2 microseconds and 12.8 microseconds respectively). The time taken for each picture element is 100 nanoseconds.

RAMs such as those used in the store typically have an access time of 400 nanoseconds. The multiplexing and buffering arrangement therefore allows codewords to be retrieved at a rate of one every 133 nanoseconds. But the coding scheme described requires codes to be retrieved, even if the colours are changing every element, at a maximum rate of only once every two picture elements, that is once every 200 nanoseconds. There is therefore a considerable margin for the store accesses.

The encoding of the display may be carried out by software in the central processor which supplies the compressed data store 2. Alternatively special-purpose hardware may be used. A suitable encoding procedure is described in our co-pending British Patent Application No. 14121/77.

MODIFICATIONS

Various modifications may be made.

The line-store 23 may be only one picture element wide. In that case the transition logic unit 25 contains a multiplexer receiving the colour information for the transition elements and passing the values for first one and then the other to a single colour register from whence they are passed on to the line store. The correlation logic then works one element at a time rather than in pairs and, for example, has a three-bit register in place of the register 68. In this case the correlation codes define the elements up to and including the one following the final transition.

It is possible, with a suitably fast compressed-data store 2, for the codewords to define the elements taken singly, rather than in pairs. This shares with the arrangement described the advantage that there is no need to retrieve both the length and the colour of a new run simultaneously.

In the arrangement described it is possible in some circumstances, for example, when a right correlation follows a left correlation, for the wrong colour (that preceding the first transition) to be inserted into the line-store 23 following the first transition. This problem may be avoided by introducing a run-length code which will fill the positions until the values in the register 64 reach the correct position. Alternatively the FINISHED signal on the line 24c may be delayed for the correct number of periods to allow the values in the register 64 to reach the correct position, the values preserved in the colour registers 47 and 48 being introduced in the meantime.

The line-store 23 may be implemented as a random-access memory addressed by counters incremented automatically to retrieve and insert values in sequence.

The display value, instead of representing colours may represent grey-scale, being converted from digital to analogue to drive a black-and-white monitor.

We claim:

1. Decoding apparatus for providing a drive output for a display device arranged to produce a display formed of a plurality of image elements scanned in a predetermined sequence, in a plurality of display lines, each element having a selected one of at least three possible image display values dependent on the drive output, the apparatus comprising:

means for receiving each of a sequence of code elements, in turn, forming a coded representation of a display line, the sequence of code elements defining the display values of the image elements in the sequence in which they are scanned and comprising at least one first code element associated with an image group, said image group consisting of N sequentially occurring image elements, N being an integer greater than one but less than the number of image elements in a display line, said first code element indicating the display value of each of the N image elements of said image group and at least one second code element indicating only the number of image groups in a segment of M image groups, where M is an integer, and the display value of all image elements in the segment being the same and equal to the display value of the image element immediately preceeding said segment, whereby a run of any number of image elements of the same display value, whether or not the transitions bounding the run are aligned with the boundaries between code elements, may be defined by a first code element defining at least the first two image elements of the run followed by at least one second code element and, if required, another first code element defining at least the final image element of the run;

means for decoding each code element, before the receipt of the following code element, to produce a control output indicating, for each individual image element of the display line, the display value of that element, which means comprises first decoding means responsive to the receipt of each first code element for causing the control output to indicate the display value of each of the individual image elements of the image group represented by that first code element, means for storing, at the completion of the decoding of each code element to produce the said control output, an indication of the display value of the final image element of those so far decoded into the control output, and second decoding means responsive to the receipt of each second code element and to the indication of a display value stored in the said storing means at that time for causing the control output to indicate the same display value of each individual image element in the segment of M image groups indicated by that second code element, which display value is that stored in the said storing means;

and means for converting the said control output into a drive output for the display.

2. Decoding apparatus for providing a drive output for a display device arranged to produce a display formed of a plurality of image elements scanned in a predetermined sequence, each image element having a selected one of at least three possible display values dependent on the drive output, the apparatus comprising:

means for receiving each of a sequence of code elements, in turn, forming a coded representation of the display, the sequence of code elements defining the display values of the image elements in the sequence in which they are scanned and comprising at least one first code element indicating, for at least one image element, a display value for that image element and at least one second code element indicating the length but not display value of a segment of image elements of the same display value which segment is immediately preceded by an image element of the same display value as the image elements of the segment, whereby at least an initial portion of a run of image elements of the same display value may be defined by a first code element defining the initial image element of the run followed by a second code element defining the length of a segment continuing the run;

means for decoding each code element, before the receipt of the following code elements, to produce a control output indicating, for each individual image element of the display, the display value of that element, which means comprises first decoding means responsive to the receipt of each first code element to cause the control output to indicate the display value of each individual image element represented; means for storing, at the completion of the decoding of a first code element, an indication of the display value of the final image element decoded into a control output, and second decoding means responsive to the receipt of each second code element and to the indication of a display value stored in the said storing means at that time to cause the control output to indicate the display value of each individual image element in a segment of picture elements of the length indicated by that second code element, which display value is that stored in the said storing means;

and means for converting the said control output into a drive output for the display.

3. Decoding apparatus as claimed in claim 1 or claim 2 in which the said sequence of code elements forming the coded representation of the display includes in addition to the said first and second code elements, third code elements, each indicating a correlation relationship between the display values of a first and a second sequence of image elements of the display, the said means for decoding the code elements to produce a control output includes third decoding means responsive to each third code element for causing the control output to indicate the display value of each individual image element of the said second sequence of image elements, the display values of the said second sequence of code elements being correlated with those of the said first sequence of image elements in the manner represented by the third code element, and there are means for introducing into the said storing means an indication of the display value of the final of the image elements represented by each of third code element.

4. A display system comprising decoding apparatus as claimed in claim 1 or claim 2, in combination with a display device responsive to the said drive output.

5. A display system as claimed in claim 4, in which the display device is a refreshed display scanned in a predetermined raster at a predetermined rate and there is included means for storing and out-putting the coded representation repeatedly for decoding.

6. A method of producing a display formed of a plurality of image elements each having a selected one of at least three possible display values on a display device which forms a display by scanning the image elements in a predetermined sequence, said method comprising the steps of: supplying in turn each of a sequence of code elements forming a coded representation of the display defining the display values of the image elements in said predetermined sequence and comprising at least one first code element indicating, for at least one image group of N image elements, N being an integer greater than 1, the display values for the N image element of said group, and at least one second code element indicating the length but not display value of a segment of M image groups have image elements of the same display value, M being an integer, said segment being immediately preceded by an image element of the same display value as the image elements of the segment, and decoding the code elements in sequence to produce a control output, which control output is converted to a drive output for causing the represented display to be formed on the display device, there being stored, at the completion of the decoding of each code element, an indication of the display value of the final image element of those so far decoded, which stored indication is used in the decoding of an immediately following second code element.

* * * * *